United States Patent
Huey

(10) Patent No.: US 8,250,203 B1
(45) Date of Patent: Aug. 21, 2012

(54) METHOD AND SYSTEM FOR NETWORK TRAFFIC MONITORING

(75) Inventor: James D. Huey, Huntington Beach, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 992 days.

(21) Appl. No.: 11/752,212

(22) Filed: May 22, 2007

(51) Int. Cl.
*G06F 15/173* (2006.01)
(52) U.S. Cl. .................... 709/224; 709/225; 709/223
(58) Field of Classification Search .................. 709/224, 709/223, 225
See application file for complete search history.

(56) References Cited

U.S. PATENT DOCUMENTS

| | | | |
|---|---|---|---|
| 6,606,630 B1 * | 8/2003 | Gunlock | 707/100 |
| 7,340,649 B2 * | 3/2008 | Angamuthu et al. | 714/27 |
| 2003/0191857 A1 * | 10/2003 | Terrell et al. | 709/244 |
| 2004/0103220 A1 * | 5/2004 | Bostick et al. | 709/253 |
| 2005/0071445 A1 * | 3/2005 | Siorek et al. | 709/223 |

* cited by examiner

*Primary Examiner* — Haresh N Patel
*Assistant Examiner* — Harunur Rashid
(74) *Attorney, Agent, or Firm* — Klein, O'Neill & Singh, LLP

(57) ABSTRACT

Method and system for collecting diagnostic information for network communication is provided. The method includes configuring a host bus adapter (HBA) to operate as a standard HBA while collecting diagnostic information in a diagnostic mode after a trigger condition occurs; storing the diagnostic information in a first memory for the HBA; transferring the diagnostic information from the first memory to a second memory in a host system that is operationally coupled to the HBA; and formatting the diagnostic information for presentation to a user.

17 Claims, 5 Drawing Sheets

Diagnostic Dump Begin

Diagnostic Dump Returned Mailbox Registers
4000 8000 0000 feed 0000 0000 0000 0000 0000 0000 0000 0000 0000 0000 0000 0000
0000 0000 0000 0000 0000 0000 0000 0000 0000 0000 0000 0000 0000 0000 0000 0000
End Diagnostic Buffer
0000000008100000: 52415449 4f4e0000 20495350 32347878 20466972 6d776172 65200000 20566572
0000000008100010: 7369f6e 00002030 0003332e 00003032 00002e30 00003320 20200000 20202400
0000000008100020: 42000000 00001002 46000000 00000000 4203f000 00021fff 40000000 0401fbd4
.
.
End
Diagnostic Dump end FCE Trace begin Enable FCE Returned Mailbox Registers
4000 8000 0000 feed 0000 0000 0000 0000
End Disable FCE Returned Mailbox Registers
4000 8000 0000 feed 0000 0000 0000 0000 0000 0000 0000 0000 0000 0000 0000 0000
0000 0000 0000 0000 0000 0000 0000 0000 0000 0000 0000 0000 0000 0000 0000 0000
End FCE Trace Buffer
0000000009100000: 52415449 4f4e0000 20495350 32347878 20466972 6d776172 65200000 20566572
0000000009100010: 7369f6e 00002030 0003332e 00003032 00002e30 00003320 20200000 20202400
0000000009100020: 42000000 00001002 46000000 00000000 4203f000 00021fff 40000000 0401fbd4
..
End
FCE Trace end

FIG. 4

METHOD AND SYSTEM FOR NETWORK TRAFFIC MONITORING

CROSS REFERENCE TO RELATED APPLICATIONS

None

1. Field of the Invention

This invention relates to Storage Area Networks (SAN), and more particularly, to tracing network information.

2. Related Art

Storage area networks ("SANs") are commonly used in systems where plural memory storage devices are made available to various computing systems (also referred to as "host systems"). Data stored in a SAN is typically moved between the plural host systems and the plural memory storage devices.

Host systems often communicate with storage systems via a controller/adapter known as a host bus adapter ("HBA"), using a local bus standard, such as the Peripheral Component Interconnect ("PCI," "PCI-X", or "PCI-Express," all used interchangeably throughout the specification) bus interface. The PCI, PCI-X and PCI-Express standards are all incorporated herein by reference in their entirety.

When an error occurs between the HBA and the Storage System, typically, a Traffic Analyzer is used to diagnose the problem. A Traffic Analyzer is specialized equipment that is used to monitor network traffic and diagnose error conditions.

In conventional systems, the Traffic Analyzer is connected to a problematic network link to capture and monitor network traffic information. While traffic analysis is performed, the port, which is connected to the Traffic Analyzer, is taken offline. A typical HBA has limited number of ports, for example, two and a loss of a port is undesirable. Furthermore, Traffic Analyzers are complex and expensive and may require additional personnel to operate and hence, undesirable.

SUMMARY

In one embodiment, a method for collecting diagnostic information for network communication is provided. The method comprises configuring a host bus adapter (HBA) to operate as a standard HBA while collecting diagnostic information in a diagnostic mode after a trigger condition occurs; storing the diagnostic information in a first memory for the HBA; transferring the diagnostic information from the first memory to a second memory in a host system that is operationally coupled to the HBA; and formatting the diagnostic information for presentation to a user.

In another embodiment, a network system is provided. The network system comprises a host system operationally coupled to a host bus adapter ("HBA") for receiving network information and transferring network information; and a storage system that receives network information from the host system and sends network information to the host system; wherein the HBA is configured to operate as a standard HBA while collecting diagnostic network information in a diagnostic mode after a trigger condition occurs and stores the diagnostic information in a first memory of the HBA and then transfers the stored diagnostic information to a second memory for the host system.

In yet another embodiment, a host bus adapter (HBA) for receiving network information and transferring network information, operationally coupled to a host system is provided. The host bus adapter comprises a processor executing firmware instructions detects a trigger condition and enables the HBA to operate in a diagnostic mode while the HBA operating as a standard HBA receives network information from the host system and sends network information to the host system; wherein the HBA is configured to operate as a standard HBA while collecting diagnostic network information in a diagnostic mode after a trigger condition occurs and stores the diagnostic information in a first memory of the HBA and then transfers the stored diagnostic information to a second memory for the host system.

This brief summary has been provided so that the nature of the invention may be understood quickly. A more complete understanding of the invention may be obtained by reference to the following detailed description of embodiments thereof in connection with the attached drawings.

BRIEF DESCRIPTION OF THE DRAWINGS

The foregoing and other features of the embodiments will now be described with reference to the drawings. In the drawings, the same components have the same reference numerals. The illustrated embodiments are intended to exemplify, the adaptive aspects of the present disclosure. The drawings include the following figures:

FIG. 4 shows an example of data format for storing diagnostic information.

DETAILED DESCRIPTION

To facilitate an understanding of the embodiments, the general architecture and operation of a SAN, a host system and a HBA are now described. The specific architecture and operation of the embodiments will then be described with reference to the general architecture.

Besides PCI, PCI-X or PCI-Express mentioned above, other standards might be used to move data from host systems to memory storage devices in a SAN. Fibre channel is one such standard. Fibre channel (incorporated herein by reference in its entirety) is an American National Standard Institute (ANSI) set of standards, which provides a serial transmission protocol for storage and network protocols such as HIPPI, SCSI, IP, ATM and others.

Fibre Channel supports three different topologies: point-to-point, arbitrated loop and Fibre Channel Fabric. The point-to-point topology attaches two devices directly. The arbitrated loop topology attaches devices in a loop. The Fibre Channel Fabric topology attaches host systems directly to a Fabric, which is connected to multiple devices. The Fibre Channel Fabric topology allows several media types to be interconnected.

The examples below are described with respect to Fibre Channel. However, the adaptive aspects are not limited to any particular protocol type.

Figure 1A:
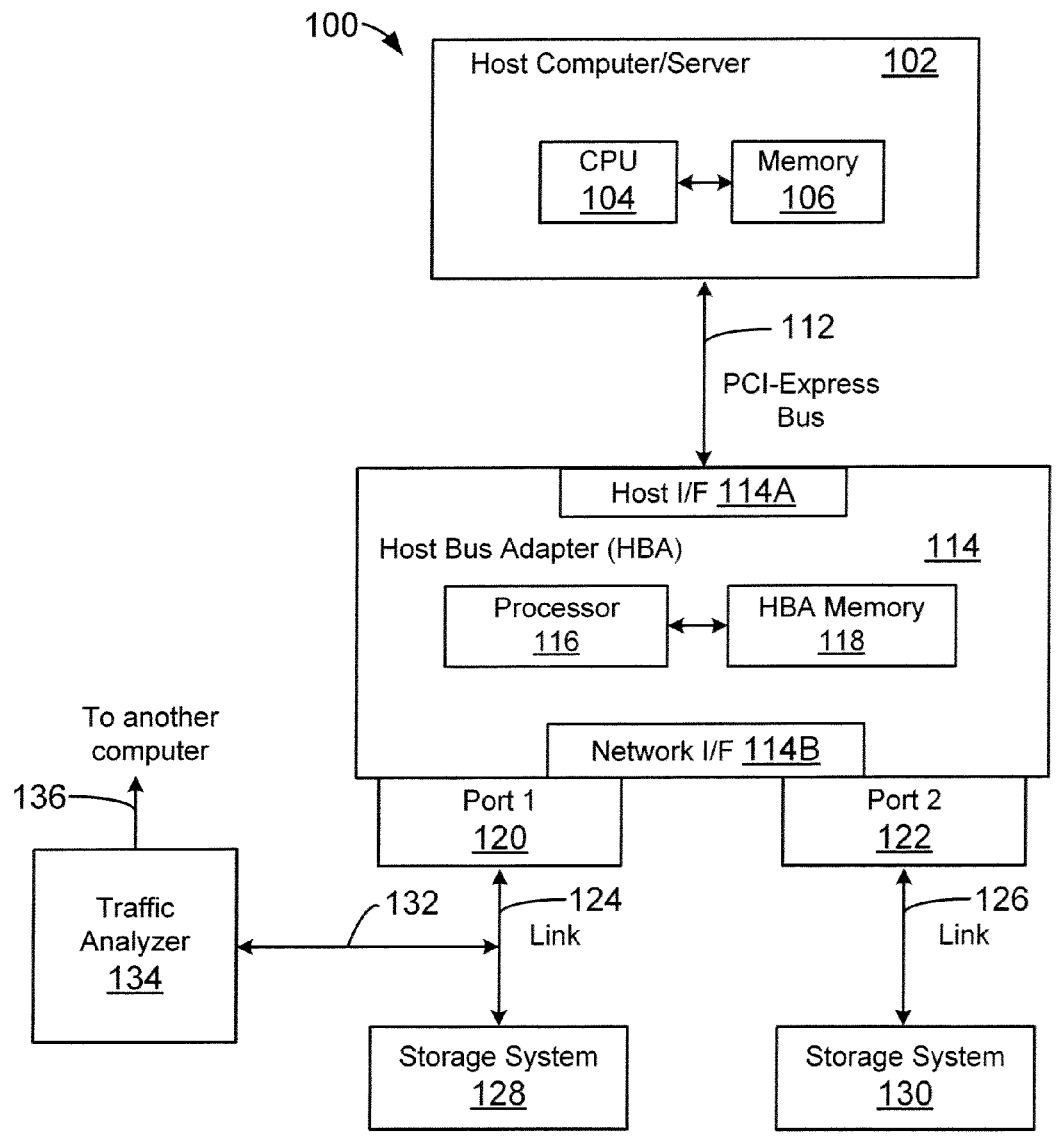
FIG. 1A shows a block diagram of a system using a traffic analyzer for analyzing network traffic.

FIG. 1A, shows a block diagram of a system 100 that includes a host system 102, which may be used as a server that can communicate with storage systems 128 and 130 via HBA 114. Host system 102 communicates with HBA 114 via a PCI-Express link 112.

Storage systems 128 and 130 may include different types of storage devices and systems, including hard disks, tapes, drums, integrated circuits, or the like, operative to hold data by any means, including magnetically, electrically, optically, and the like.

Host system 102 includes a central processing unit (CPU) 104 for executing computer-executable process steps out of memory 106 (may also be referred to as host memory 106). Host memory 106 is coupled to CPU 104 via a system bus (not shown) or a local memory bus (not shown). Host memory 106 is used to provide CPU 104 access to data and program information that is stored in host memory 106 at execution time. Typically, host memory 106 is composed of random access memory (RAM) circuits. A computing system with the CPU and main memory is often referred to as a host system.

HBA 114 includes a processor 116, HBA memory 118, and ports 120, 122. Processor 116 may be a reduced instruction set computer ("RISC") that executes firmware instructions out of HBA memory 118 for controlling overall HBA 114 operations.

Ports 120 and 122 are used to send and receive information to and from storage systems 128 and 130. Ports 120 and 122 have a transmit segment and a receive segment (not shown). Port 120 is connected to Storage System 128, via link 124, while Port 122 is connected to Storage System 130, via link 126. Although a direct link is shown for Port 120 and 122 connections, it is understood that these connections may be via other network elements or nodes, for example, via a network switch (not shown). Links 124 and 126 may be Fibre Channel links to support communication between Fibre Channel devices.

HBA 114 interfaces with host computer 102 via host interface 114A and bus 112. The structure and design of host interface 114A depends on the type of host computer 102. For example, if bus 112 is a PCI-Express bus, then interface 114A includes logic and hardware to handle PCI-Express based communication.

HBA 114 interfaces with storage systems 128 and 130 via network interface 114B and links 124 and 126. The structure of network interface 114B depends on the network protocol and standard used by HBA 114. For example, if Fibre Channel is used as the network protocol, then network interface 114B includes a Fibre Channel protocol module that handles and processes incoming (i.e. from the network) Fibre Channel frames and outgoing (i.e. from host computer 102) Fibre Channel frames.

QLogic Corporation, the assignee of the present invention provides HBA 114 in various configurations that may be used to implement the adaptive aspects disclosed herein.

In conventional systems, if an error occurs on a particular link, for example, link 124, then a Traffic Analyzer 134 is connected to the affected port (120) via connection (or link) 132. Traffic analyzer 134 collects network information to diagnose the error condition(s). The collected data then is sent via connection 136 to another computing system (not shown).

Using traffic analyzer 134 has shortcomings. For example, port 120 has to be taken off-line while the data is being collected. This results in 50% port utilization for HBA 114. Furthermore, Traffic Analyzer 134 is expensive and cumbersome and may need extra personnel to operate and interpret results.

In one embodiment, as described below, HBA 114 operates as a Traffic Analyzer and collects network information while both ports 120 and 122 operate normally and hence there is minimal loss of port utilization.

Figure 1B:
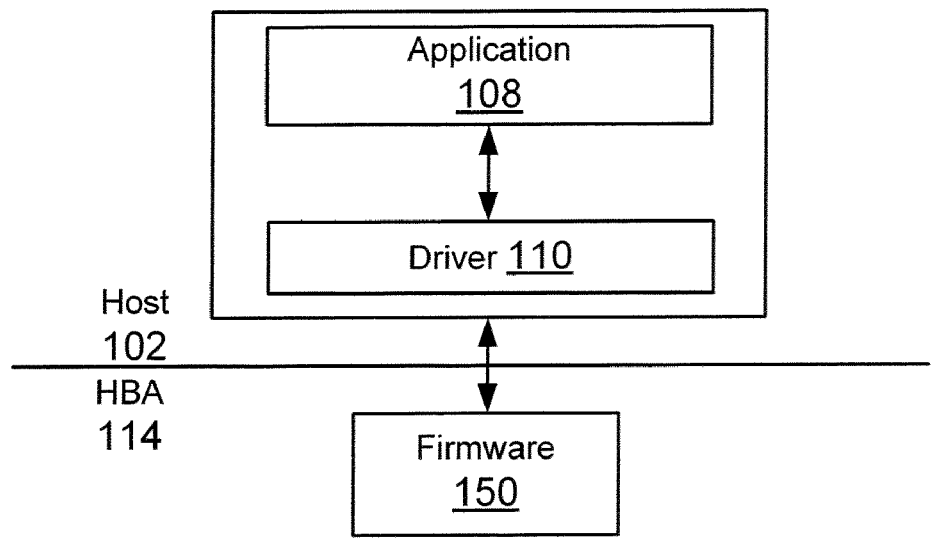
FIG. 1B shows a block diagram of a software architecture used according to one embodiment.

FIG. 1B shows a top-level block diagram for a software/firmware configuration used by system 100. Application 108 interfaces with HBA driver 110 to send and receive data via HBA 114. Firmware 150 interfaces with HBA driver 110 to move information to and from host computer 102.

Figure 2:
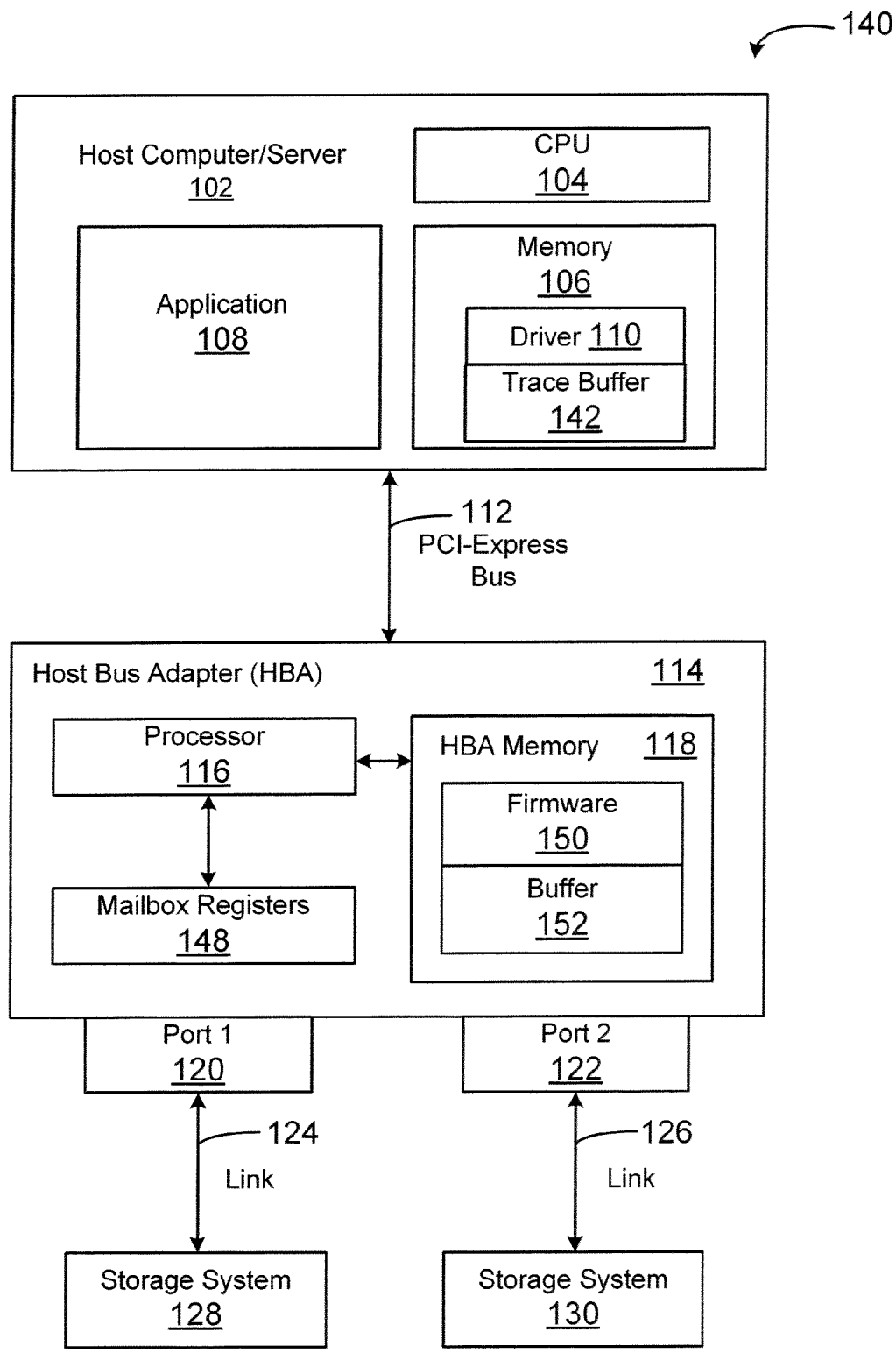
FIG. 2 shows a block diagram of a system using a HBA for network traffic analysis, according to an embodiment.

FIG. 2 shows a block diagram of system 140, according to one embodiment. In this embodiment, HBA 114 operates in a diagnostic mode to collect network information. For a Fibre Channel network, the diagnostic information may include, without limitation, ELS (Extended Link Service) Fibre Channel Frames and BLS (Basic Link Service) Fibre Channel Frames. The adaptive aspects disclosed herein are not limited to collecting any particular type of diagnostic information.

The diagnostic mode may be enabled or disabled by firmware 150. The conditions to enable or disable the diagnostic mode may be pre-programmed and stored in HBA memory 118. While operating in the diagnostic mode, HBA 114 continues to process network information as it would during HBA 114 standard operating mode.

In one embodiment, different diagnostic levels may be programmed or set. These levels may include a minimal diagnostic level where some very basic information is collected. Higher diagnostic level imply that more information is collected. For example, a higher diagnostic level may include tracing actual SCSI frames and command frames.

In one embodiment, HBA driver 110 executed by CPU 104 in host system 102 allocates a trace buffer (may also be referred to as "Fibre Channel and event tracing" (FCE) buffer) 142 in host memory 106 for storing diagnostic information received from HBA 114, when HBA 114 is operating in the diagnostic mode. HBA Driver 110 specifies the size and physical address of FCE 142. In one example and without limitation, the size of FCE 142 may be a multiple of 16K Bytes.

Processor 116 assigns a buffer 152 in HBA memory 118 for storing diagnostic information when HBA 114 operates in a diagnostic mode. In one example, buffer 152 may be 8 KB in size. Diagnostic information is first stored in buffer 152 and then moved to FCE buffer 142.

Mailbox Registers 148 may be used to facilitate communication between host system 102 and HBA 114. In one aspect, when buffer 152 is full, processor 116 sets a bit in mailbox register 148, which indicates to the host computer 102 that diagnostic information is ready for retrieval.

Application 108 interprets diagnostic information from HBA 114 and generates a user-friendly output. The output can be customized based on user defined settings. For example, if an end-user were a field-engineer then the output may provide more detail than in case of a HBA end-user.

By providing FCE buffer 142, buffer 152, Mailbox register 148 and extended capability of Firmware 150 an interface an external Traffic Analyzer (134) is not needed.

Format for Storing Diagnostic Information:

Diagnostic information collected by HBA 114 is stored in a standard format so that Application 108 can easily format the information for a user. In one example, FCE Buffer 142 stores packets and each packet may include a 64-bit packet header. Each packet may have a length equal to a 32-bit multiple. Table I below shows an example of a format for packet headers.

TABLE I

| 32-bit Word | Description | | |
|---|---|---|---|
| 0 | FCE Packet Type [31:24] | Reserved [23:12] | Payload Length [11:0] |
| 1 | Reserved [31:24] | Timestamp [23:0] | |
| X | Payload defined by Type (not required) | | |

Bits 31:24 designate the packet type; the payload length is specified by bits 11:0; and a timestamp value is specified by bits 23:12.

The packet types are defined so that post processing of diagnostic information is done with relative ease. The following provides an example of different packet types: Transmitted Frame Data (Type=0x03); Received Frame Data (Type=0x04); and Link Event reported (Type=0x25).

The transmitted and received frames include basic link service and Extended Link Service Frames. Link event reported frames include asynchronous events that are reported by firmware 150 to HBA driver 110.

Mailbox registers 148 may include a plurality of mailboxes that may be programmed by inserting plural values to control HBA 114 tracing. Table 2 below shows the general structure of trace control and diagnostics mailbox commands. For example, mailbox 0 may be set to a value 0x27 to enable or disable tracing. The trace diagnostic command may be set in mailbox 1 which notifies firmware 150 of what action is desired.

TABLE 2

| Mailbox | Operation |
| --- | --- |
| 0 | Trace control mailbox command (27 h) |
| 1 [7:0] | Trace/Diagnostics Command |
| 2-31 | Trace/Diagnostics Command Parameters |

The following provides an example of different types of commands that may be programmed in mailbox registers 148 (for example, in mailbox 1, Table 2)

"Insert Timestamp" (Mailbox 1 value=0x0001): This command is used to insert a system level timestamp as provided by driver 110.

"Enable Fibre Channel and Event Tracing" Mailbox 1 Value=0x0008): This command establishes and enable FCE 142 at the physical address and specified length. This enables HBA 114 to start storing network information that is used for diagnostic purposes.

Figure 3B:
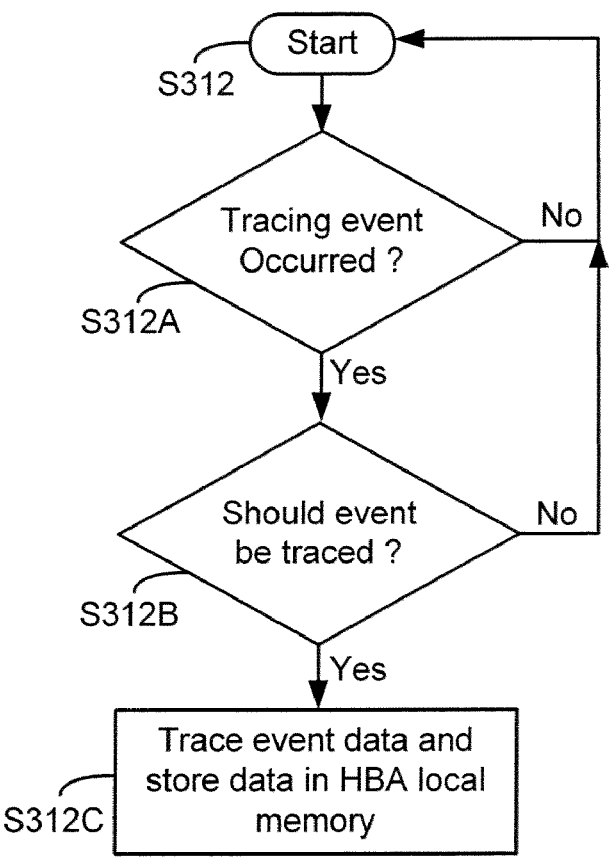
FIG. 3B shows a process flow diagram for tracing network events, according to an embodiment.
Figure 3A:
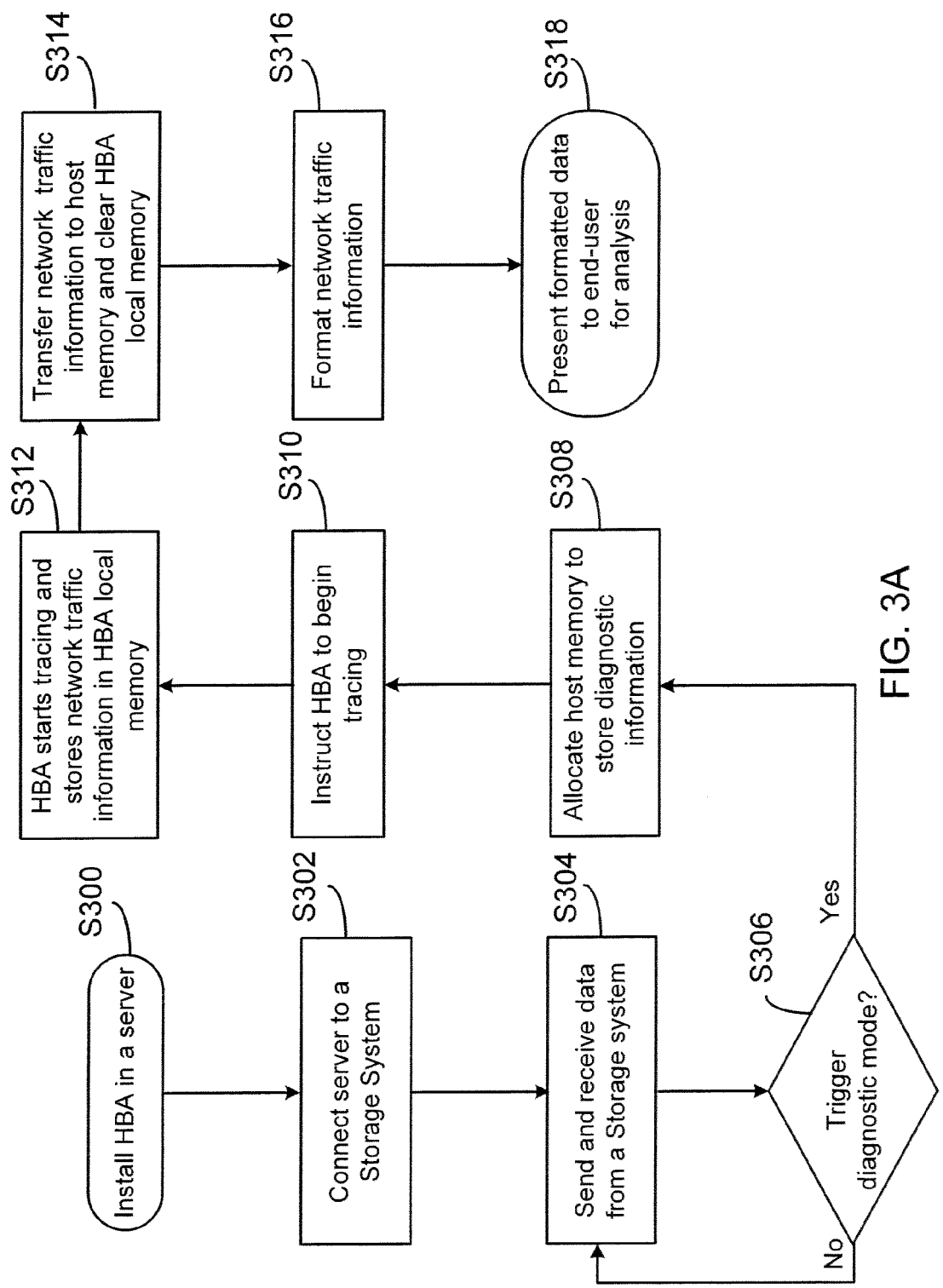
FIG. 3A shows a process flow diagram for network traffic analysis, according to an embodiment of the present disclosure.

Process Flow:

FIG. 3A shows a process flow diagram for using HBA 114 for collecting diagnostic information without losing normal port operation, according to one embodiment. The process starts in step S300 after HBA 114 is installed in Host system 102. Installing HBA 114 allows host system to send and receive information is a SAN.

In step S302, Host 102 is connected to Storage Systems 128 and 130 via network links 124 and 126. In Step S304, HBA 114 operates normally by receiving and sending data.

In step S306, firmware 150 determines if a condition for operating in the diagnostic mode is triggered. As described above, the conditions may be pre-programmed. If a diagnostic trigger condition has not occurred, then HBA 114 simply operates as a standard HBA.

If a diagnostic trigger condition occurs in step S306, then in step S308, driver 110 allocates part of host memory 106 to serve as FCE buffer 142 and notifies HBA 114 of the location and size of FCE buffer 142.

In step S310, host driver 110 instructs HBA 114 to start operating in a diagnostic mode and to start tracing (i.e. storing) diagnostic information.

In step S312, HBA 114 stores network traffic information in buffer 152. For example, for a Fibre Channel system, Extended Link Service (ELS) frames may be stored in buffer 152. HBA 114 operates as a standard HBA while it collects network traffic information for diagnostic purposes. Step S312 is described below in detail with respect to FIG. 3B.

In step S314 stored network traffic information is transferred to FOE buffer 142 and local HBA memory is cleared.

In step S316, application 108 processes diagnostic information and converts it into a user-friendly format. The type of format will depend on what the user is expecting. FIG. 4 provides an example of a data format for presenting diagnostic information.

In step S318, diagnostic results are presented to an end user for analysis and further action.

FIG. 3B shows a process flow diagram for step S312 (FIG. 3A) for tracing network events, according to one embodiment. In step S312A, HBA 114 determines if a tracing event has occurred. The event may be programmed by firmware 150 and may vary from an environment to another. Examples of tracing events include receipt of a Fibre Channel frame; transmission of a Fibre Channel frame; a link error occurs and a PCI-Express link event (when link 112 is a PCI-Express link).

If the tracing event has not occurred then the process moves to S312 and HBA starts tracing network events.

In step S312B, processor 116 determines if the event should be traced. This again can be pre-programmed by firmware 150 so that tracing begins when a particular tracing event occurs.

If the processor 116 determines that a particular event does not need to be traced the process moves to S312 and HBA starts tracing network events.

In step S312C, HBA 114 traces event related data and stores the data in HBA local memory 118.

In one aspect, diagnostic information is collected and presented to a user while a HBA operates to send and receive network information. Expensive traffic analyzers are not used and the HBA does not lose any ports while operating in a diagnostic mode.

Although the present disclosure has been described with reference to specific embodiments, these embodiments are illustrative only and not limiting. Many other applications and embodiments of the present disclosure will be apparent in light of this disclosure and the following claims.

What is claimed is:

1. A method, comprising:

providing a host system with a host system memory and coupled to a host bus adapter (HBA) having a HBA memory;

configuring the HBA to detect a trigger condition for a diagnostic mode during which the HBA is configured to operate at a different diagnostic levels for selectively collecting the diagnostic information based on a configured diagnostic level as well as a standard HBA transferring information to and from the host system over a network;

initiating the diagnostic mode from the host system by assigning a portion of the host memory as a second memory; indicating the location of the second memory to the HBA;

and indicating the initiation of the diagnostic mode to the HBA;

assigning a portion of the HBA memory as a first memory upon initiation of the diagnostic mode;

storing the diagnostic information in the first memory of the HBA;

transferring the diagnostic information from the first memory of the HBA to the second memory in the host system while the HBA continues to operate as a standard HBA;

and storing the diagnostic information at the second memory in a format such that an application executed by the host system can format the information for presentation to a user; and formatting the diagnostic information by the host system for presentation to the user.

2. The method of claim 1, wherein the HBA is configured to operate in the diagnostic mode by setting a bit value in a register that is accessible by HBA firmware.

3. The method of claim 1, further comprising:
pre-programming the trigger condition in the HBA; and
reporting the occurrence of the trigger condition to the host system so as to initiate the diagnostic mode.

4. The method of claim 1, wherein the first memory is a buffer in the HBA memory and is allocated by a HBA processor.

5. The method of claim 1, wherein the second memory is a buffer in the host system memory and is allocated by a HBA driver executed by a host system processor.

6. The method of claim 1, wherein a mailbox register is used for initiating transfer of diagnostic information from the first memory to the second memory.

7. A network system comprising:
a host system with a host memory;
a host bus adapter ("HBA") with a HBA memory, the HBA coupled to the host system and configured to operate in a diagnostic mode after a trigger condition is detected and during the diagnostic mode, the HBA transfers information to and from the host system over a network as a standard HBA while operating at a different diagnostic levels for selectively collecting diagnostic information based on a configured diagnostic level; and
a storage system that receives information from the host system and sends information to the host system via the HBA over the network;
wherein the host system initiates the diagnostic mode by assigning a portion of the host memory as a second memory;
indicates the location of the second memory to the HBA and indicates initiation of the diagnostic mode to the HBA; and
wherein upon initiation of the diagnostic mode, the HBA assigns a portion of the HBA memory as a first memory;
stores the diagnostic information in the first memory;
transfers the diagnostic information from the first memory of the HBA to the second memory in the host system while continuing to operate as a standard HBA and stores the diagnostic information at the second memory in a format such that an application executed by the host system can format information for presentation to a user.

8. The system of claim 7, wherein the HBA is configured to operate in the diagnostic mode by setting a bit value in a register that is accessible by HBA firmware.

9. The system of claim 7, wherein the trigger condition is pre-programmed in the HBA and the HBA reports the occurrence of the trigger condition to the host system so as to initiate the diagnostic mode.

10. The system of claim 7, wherein the first memory is a buffer in the HBA memory and is allocated by a HBA processor.

11. The system of claim 7, wherein the second memory is a buffer in the host system memory and is allocated by a HBA driver executed by a host system processor.

12. The system of claim 7, wherein a mailbox register in the HBA is used for initiating transfer of diagnostic information from the first memory to the second memory.

13. A host bus adapter (HBA) operationally coupled to a host system for receiving and transferring information, comprising:
a processor executing firmware instructions detects a pre-programmed trigger condition and enables the HBA to operate in a diagnostic mode during which the HBA is configured to operate at different diagnostic levels for collecting the diagnostic information based on configured diagnostic level; and
a HBA memory, a portion of which is assigned as a first memory to store diagnostic information when the HBA operates in the diagnostic mode;
wherein after detecting the trigger condition, the HBA is configured to report the trigger condition to the host system and the host system is configured to initiate the diagnostic mode operation by assigning a second memory in the host system, indicating the location of the second memory to the HBA, and indicating initiation of the diagnostic mode to the HBA;
wherein upon initiation of the diagnostic mode, the processor assigns the first memory for storing the diagnostic information; and
when operating in the diagnostic mode, the HBA continues to operate as a standard HBA to receive information from the host system and send network information to the host system while also collecting diagnostic information, storing the diagnostic information in the first memory of the HBA, transferring the diagnostic information to the second memory of the host system; and storing the diagnostic information at the second memory in a format such that an application executed by the host system can format the information for a presentation to a user.

14. The system of claim 13, wherein the HBA is configured to operate in the diagnostic mode by setting a bit value in a register that is accessible by HBA firmware.

15. The system of claim 13, wherein the first memory is a buffer in the HBA memory and is allocated by the HBA processor.

16. The system of claim 13, wherein the second memory is a buffer in the host system memory and is allocated by a HBA driver executed by a host system processor.

17. The system of claim 13, wherein a mailbox register in the HBA is used for initiating transfer of the diagnostic information from the first memory to the second memory.

* * * * *

UNITED STATES PATENT AND TRADEMARK OFFICE
CERTIFICATE OF CORRECTION

| | | |
|---|---|---|
| PATENT NO. | : 8,250,203 B1 | Page 1 of 1 |
| APPLICATION NO. | : 11/752212 | |
| DATED | : August 21, 2012 | |
| INVENTOR(S) | : James D. Huey | |

It is certified that error appears in the above-identified patent and that said Letters Patent is hereby corrected as shown below:

In column 6, line 45, in Claim 1, after "operate at" delete "a".

In column 7, line 27, in Claim 7, after "operating at" delete "a".

In column 7, line 48, in Claim 7, after "format" insert -- the --.

In column 8, line 16, in Claim 13, after "based on" insert -- a --.

In column 8, line 40, in Claim 13, after "information for" delete "a".

Signed and Sealed this
Sixth Day of November, 2012

David J. Kappos
*Director of the United States Patent and Trademark Office*